United States Patent
Karame et al.

(10) Patent No.: US 11,233,656 B2
(45) Date of Patent: Jan. 25, 2022

(54) METHOD FOR MINING A BLOCK IN A DECENTRALIZED BLOCKCHAIN CONSENSUS NETWORK

(71) Applicant: NEC Laboratories Europe GmbH, Heidelberg (DE)

(72) Inventors: Ghassan Karame, Heidelberg (DE); Jens-Matthias Bohli, Leimen (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 281 days.

(21) Appl. No.: 16/481,497

(22) PCT Filed: Feb. 24, 2017

(86) PCT No.: PCT/EP2017/054416
§ 371 (c)(1),
(2) Date: Jul. 29, 2019

(87) PCT Pub. No.: WO2018/153485
PCT Pub. Date: Aug. 30, 2018

(65) Prior Publication Data
US 2019/0394047 A1  Dec. 26, 2019

(51) Int. Cl.
*H04L 9/32* (2006.01)
*H04L 29/06* (2006.01)
*H04L 29/08* (2006.01)

(52) U.S. Cl.
CPC .......... *H04L 9/3247* (2013.01); *H04L 9/3239* (2013.01); *H04L 63/1441* (2013.01);
(Continued)

(58) Field of Classification Search
CPC . H04L 9/3247; H04L 9/3239; H04L 63/1441; H04L 67/104; H04L 2209/38;
(Continued)

(56) References Cited

U.S. PATENT DOCUMENTS 10,554,746 B2 *  2/2020  Bathen .................. H04L 9/3247
2016/0027229 A1   1/2016  Spanos et al.
(Continued)

FOREIGN PATENT DOCUMENTS

WO   WO 2017006136 A1   1/2017

OTHER PUBLICATIONS

Jian Liu et al: "scalable Byzantine Consensus via Hardware-assisted Secret Sharing", arxiv.org, Dec. 15, 2016 (Dec. 15, 2016), XP080744551, pp. 1-11.
(Continued)

*Primary Examiner* — Christopher A Revak
(74) *Attorney, Agent, or Firm* — Leydig, Voit & Mayer, Ltd.

(57) ABSTRACT

A method for mining a block in a decentralized blockchain consensus network (DBCN) includes sending, by a mining computing entity (MCE), a signing request for mining a new block of a blockchain to a trusted execution environment computing entity (TEE-CE), the signing request including block information, the block information including block height information, and comparing, by the TEE-CE, the block height information of the signing request with block height information from a last signing request and providing a matching, when the difference between the block height information of the signing request and the block height information from the last signing request satisfies a defined value. The method further comprises, upon providing the matching, signing, by the TEE-CE, the new block based on the block information, and providing, by the MCE, the new signed block to the DBCN.

15 Claims, 6 Drawing Sheets

(52) U.S. Cl.
CPC ........ *H04L 67/104* (2013.01); *H04L 2209/38* (2013.01); *H04L 2209/56* (2013.01)

(58) Field of Classification Search
CPC ... H04L 2209/56; H04L 63/126; H04L 63/14; G06Q 2220/00; G06Q 20/065; G06Q 20/3678; G06F 21/57; G06F 21/64; G09C 1/00
See application file for complete search history.

(56) References Cited

U.S. PATENT DOCUMENTS

| | | | |
|---|---|---|---|
| 2016/0218879 | A1 | 7/2016 | Ferrin |
| 2016/0259937 | A1 | 9/2016 | Ford et al. |
| 2016/0342977 | A1 | 11/2016 | Lam |
| 2020/0104809 | A1* | 4/2020 | Destefanis ................ H04L 9/32 |
| 2020/0145195 | A1* | 5/2020 | Ma ...................... G06F 16/2365 |
| 2020/0228318 | A1* | 7/2020 | Karame ................ H04L 9/3297 |
| 2020/0279284 | A1* | 9/2020 | Garg ...................... G06Q 20/02 |
| 2021/0135854 | A1* | 5/2021 | Karame ................... H04L 9/06 |

OTHER PUBLICATIONS

Sinisa Matetic et al: "ROTE: Rollback Protection for Trusted Execution", International Association for Cryptologic Research, vol. 20170212:130719, Feb. 12, 2017 (Feb. 12, 2017), XP061022567, pp. 1-21.

Fan Zhang et al: "REM: Resource-Efficient Mining for Blockchains", International Association for Cryptologic Research, vol. 20170306:192419, Feb. 23, 2017 (Feb. 23, 2017), XP061022872, pp. 1-27.

Florian Tschorsch et al: "Bitcoin and Beyond: A Technical Survey on Decentralized Digital Currencies", International Association for Cryptologic Research, vol. 20150517:090557, May 15, 2015 (May 15, 2015), XP061018443, pp. 1-37.

Arthur Gervais, et al., "On the Security and Performance of Proof of Work Blockchains", CCS '16 Proceedings of the 2016 ACM SIGSAC Conference on Computer and Communications Security, Oct. 24-28, 2016, pp. 3-16.

Ghassan Karame, et al., "Two Bitcoins at the Price of One? Double-Spending Attacks on Fast Payments in Bitcoin", Proceedings of the ACM Conference on Computer and Communications Security (CCS), Dec. 2012, pp. 1-17.

Vitalik Buterin, "Slasher: A Punitive Proof-of-Stake Algorithm", Jan. 15, 2014, pp. 1-5.

Christian Decker, et al., "Information Propagation in the Bitcoin Network", 13th IEEE International Conference on Peer-to-Peer Computing, Dec. 2013, pp. 1-10.

Ronald Cramer, et al., "Proofs of Partial Knowledge and Simplified Design of Witness Hiding Protocols", Appears as CWI Report CS-R9413, Feb. 1994, pp. 1-18.

* cited by examiner

METHOD FOR MINING A BLOCK IN A DECENTRALIZED BLOCKCHAIN CONSENSUS NETWORK

CROSS REFERENCE TO RELATED APPLICATIONS

This application is a U.S. National Stage Application under 35 U.S.C. § 371 of International Application No. PCT/EP2017/054416 filed on Feb. 24, 2017. The International Application was published in English on Aug. 30, 2018, as WO 2018/153485 A1 under PCT Article 21(2).

FIELD

The present invention relates to a method for mining a block in a decentralized blockchain consensus network by a mining computing entity, 'MCE'.

The present invention further relates to a decentralized block chain consensus network, comprising a plurality of node computing entities, at least one mining computing entity, 'MCE', and trusted environment execution computing entity, 'TEE-CE'.

The present invention further relates to a mining computing entity, 'MCE', for mining a transaction in a decentralized blockchain consensus network.

The present invention further relates to a method for mining a block in a decentralized blockchain consensus network by a mining computing entity, 'MCE'.

The present invention even further relates to a trusted execution environment computing entity, 'TEE-CE' for signing a block of a blockchain in a decentralized blockchain consensus network.

The present invention even further relates to a method for signing a block of a blockchain by a trusted execution environment computing entity, 'TEE-CE'.

The present invention even further relates to a non-transitory computer readable medium storing a program causing a computer to execute a method for mining a block in a decentralized blockchain consensus network by a mining computing entity, 'MCE'.

The present invention even further relates to non-transitory computer readable medium storing a program causing a computer to execute a method for mining a block in a decentralized blockchain consensus network.

The present invention further relates to non-transitory computer readable medium storing a program causing a computer to execute a method for signing a block of a blockchain.

BACKGROUND

Proof-of-works are getting more and more important in information technology security. For example crypto-currencies like Bitcoin rely on proof-of-works to thwart the overproduction.

Bitcoin is a decentralized payment system and is currently gaining popularity as a digital currency; several businesses are starting to accept Bitcoin transactions. For instance, Bitcoins were used as a form of fast payment in a local fast-food restaurant.

Bitcoin is a Proof-of-Work (POW) based currency that allows users to "mine" for digital coins by performing computations. Users execute payments by digitally signing their transactions and are prevented from double-spending their coins (i.e., signing-over the same coin to two different users) through a distributed time-stamping service. This service operates on top of the Bitcoin Peer-to-Peer (P2P) network that ensures that all transactions and their order of execution are available to all Bitcoin users.

Bitcoin is increasingly used in a number of "fast payment" scenarios, where the exchange time between the currency and goods is short. Examples include online services, ATM withdrawals, vending machine payments and fast-food payments, where the payment is followed by fast (<30 seconds) delivery of goods. While Bitcoin PoW-based time-stamping mechanism is appropriate for slow payments (e.g., on-line orders with delivery of physical goods), it requires tens of minutes to confirm a transaction and is therefore inappropriate for fast payments. This mechanism is, however, essential for the detection of double-spending attacks—in which an adversary attempts to use some of her coins for two or more payments. Since Bitcoin users are anonymous and users (are encouraged to) hold many accounts, there is only limited value in verifying the payment after the user obtained the goods (and e.g., left the store) or services (e.g., access to on-line content).

Double-spending attacks may be launched in particular during a temporary fork until the Bitcoin network merges the forks and agrees on the total order of transactions.

At present, blockchain forking is the one of the main challenges for distributed consensus. It slows down the time for the network to reach consensus and reduces the efficiency of the system.

The original conventional Proof-of-Work consensus protocol or mining protocol as disclosed in the non-patent literature of Gervais, A., Karame, G. et al, "On the Security and Performance of Proof of Work Blockchains, available under https://eprintiacr.org/2016/555.pdf was criticized for its waste of energy for mining (as disclosed in the non-patent literature of Karame, Androulaki, & Capkun, 2012, Double-Spending Attacks on Fast Payments in Bitcoin. *Proceedings of the ACM Conference on Computer and Communications Security* (*CCS*). Chicago, Ill., USA), miners have to invest computation resources to repeatedly perform hashing functions until the right parameters are found to make the block legitimate. Therefore, a further conventional blockchain was proposed using multiple virtual mining protocols such as Proof-of-Stake PoS and Proof-of-Elapsed-Time PoET. Instead of brute-forcing the next block with computation resources, a node here uses his virtual mining resources such as stakes PoS or random timer returned by its secure hardware PoET to mine the next block. However, since the mining process comes without much cost, the main risk in virtual mining is nothing-at-stake, i.e., a node that can mine multiple blocks at the same time in order to increase its chance among all miners so that one of its blocks will be finally included in the blockchain and thus gaining the reward. Consequently, mining multiple blocks can create multiple forks in the system, and nodes can in turn work on multiple forks (branches) at the same time, thus increasing the number of forks in the system exponentially, which will considerably slow down the consensus speed and increase the risk of double-spending.

Some conventional methods, e.g. disclosed in the non-patent literature of Buterin, V. (2014, January) Slasher: A Punitive Proof-of-Stake Algorithm, available under https://blog.ethereum.org/2014/01/15/slasher-a-punitive-proof-of-stake-algorithm/ involve penalizing miners if they simultaneously create blocks on multiple forks or voting on the "wrong" fork. This is done by holding some deposit of the miners for a period and allowing the reclamation only if no misbehaviour is detected and reported. For example, Slasher 1.0 as disclosed herein delays the reward claiming by locking the reward for some number of blocks. The reward and possibly some deposit can be destroyed whenever the misbehavior is detected and is included in the blockchain before the claiming point.

SUMMARY

In an embodiment, the present invention provides a method for mining a block in a decentralized blockchain consensus network (DBCN). The method comprising sending by a mining computing entity (MCE), a signing request for mining a new block of a blockchain to a trusted execution environment computing entity (TEE-CE), the signing request including block information, the block information including block height information, and comparing, by the TEE-CE, the block height information of the signing request with block height information from a last signing request and providing a matching, when the difference between the block height information of the signing request and the block height information from the last signing request satisfies a defined value. The method further comprises, upon providing the matching, signing, by the TEE-CE, the new block based on the block information, and providing, by the MCE, the new signed block to the DBCN.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The conventional methods described above only add disincentives but cannot completely prevent misbehaviour. Namely, they may only stop opportunistic attacks, but not those targeted attacks that intend to manipulate the transactions. This is the case since these conventional methods only cost the malicious nodes losing their deposits or rewards which in some cases comparing to what they can gain, e.g., double-spend some transactions that involves huge amount of stake or transactions with important assets.

Embodiments of the present invention prevent intentional forks in the blockchain caused by miners generating conflicting blocks. Embodiments of the present invention stop not only opportunistic attacks but attacks intending to manipulate transactions. Embodiments of the present invention also enhance security, to at least reduce double spending attacks and to increase the efficiency of the system.

In an embodiment, the present invention provides a method for mining a block in a decentralized blockchain consensus network 'DBCN', said method comprising the steps of:
a) Sending by a mining computing entity, 'MCE', a signing request for mining a new block of a blockchain to a trusted execution environment computing entity, 'TEE-CE', said signing request including block information, said block information including block height information,
b) Comparing, by the TEE-CE, the block height information of the signing request with the block height information from the last signing request and providing a matching, when the difference between said two block height information satisfies a defined value
c) Upon matching, signing, by said TEE-CE the new block based on the block information, and
d) Providing, by said MCE, the new signed block to said DBCN.

In a further embodiment the present invention provides a decentralized blockchain consensus network, 'DBCN', comprising a plurality of node computing entities, at least one mining computing entity, 'MCE', and a trusted environment execution computing entity, 'TEE-CE', said MCE being adapted to:
i. Send a signing request for mining a new block of a blockchain to said TEE-CE, said signing request including block information, said block information including block height information,
ii. Receive, upon successful matching, the signed new block based on the block information from said TEE-CE, and to
iii. Provide the new signed block to at least one node computing entity in said DBCN and said TEE-CE being adapted to
A) Receive, from said MCE, a signing request for mining a new block of a blockchain, said signing request including block information, said block information including block height information
B) Compare the block height information of the received signing request with the block height information from the last signing request and
C) Provide a matching, when the difference between said two block height information satisfies a defined value,
D) Sign the new block based on the block information upon matching, and to
E) Send the signed new block to said MCE.

In a further embodiment the present invention provides a mining computing entity, 'MCE' for mining a block in a decentralized blockchain consensus network, 'DBCN', adapted to:
i. Send a signing request for mining a new block of a blockchain to a trusted execution environment computing entity, 'TEE-CE', said signing request including block information, said block information including block height information
ii. Receive, upon successful matching, the signed new block based on the block information from the TEE-CE, and to
iii. Provide the new signed block to said DBCN.

In a further embodiment the present invention provides a method for mining a block in a decentralized blockchain consensus network, 'DBCN', by a mining computing entity, 'MCE', comprising the steps of:
i. Sending a signing request for mining a new block of a blockchain to a trusted execution environment computing entity, 'TEE-CE', said signing request including block information, said block information including block height information ii. Receiving, upon successful matching, the signed new block based on the block information from the TEE-CE, and iii. Providing the new signed block to said DBCN.

In a further embodiment the present invention provides a trusted execution environment computing entity, 'TEE-CE', for signing a block of a blockchain in a decentralized blockchain consensus network, 'DBCN', adapted to:

A) Receive, from a mining computing entity, 'MCE', a signing request for mining a new block of a blockchain, said signing request including block information, said block information including block height information B) Compare the block height information of the received signing request with the block height information from the last signing request and C) Provide a matching, when the difference between said two block height information satisfies a defined value, D) Sign the new block based on the block information upon matching, and to E) Send the signed new block to said MCE.

In a further embodiment the present invention provides a method for signing a block of a blockchain by a trusted execution environment computing entity, 'TEE-CE', comprising the steps of:

A) Receiving, from a mining computing entity, 'MCE', a signing request for mining a new block of a blockchain, said signing request including block information, said block information including block height information B) Comparing the block height information of the received signing request with the block height information from the last signing request and C) Providing a matching, when the difference between said two block height information satisfies a defined value, D) Signing the new block based on the block information upon matching, and E) Sending the signed new block to said MCE.

In a further embodiment the present invention provides a non-transitory computer readable medium storing a program causing a computer to execute a method for mining a block in a decentralized blockchain consensus network, 'DBCN', said method comprising the steps of:

a) Sending by computing entity 'MCE', a signing request for mining a new block of a blockchain to a trusted execution environment computing entity, 'TEE-CE', said signing request including block information, said block information including block height information, b) Comparing, by the TEE-CE, the block height information of the signing request with the block height information from the last signing request and providing a matching, when the difference between said two block height information satisfies a defined value c) Upon matching, signing, by said TEE-CE the new block based on the block information, and d) Providing the new signed block to said DBCN.

In a further embodiment the present invention provides a non-transitory computer readable medium storing a program causing a computer to execute a method for mining a block in a decentralized blockchain consensus network, 'DBCN', comprising the steps of:

i. Sending by a mining computing entity, 'MCE', a signing request for mining a new block of a blockchain to a trusted execution environment computing entity, 'TEE-CE', said signing request including block information, said block information including block height information ii. Receiving, upon successful matching, the signed new block based on the block information from the TEE-CE, and iii. Providing the new signed block to said DBCN.

In a further embodiment the present invention provides a non-transitory computer readable medium storing a program causing a computer to execute a method for signing a block of a blockchain, comprising the steps of:

A) Receiving, from a mining computing entity, 'MCE', a signing request for mining a new block of a blockchain, said signing request including block information, said block information including block height information B) Comparing the block height information of the received signing request with the block height information from the last signing request and C) Providing a matching, when the difference between said two block height information satisfies a defined value, D) Signing the new block based on the block information upon matching, and E) Sending the signed new block to said MCE.

In other words the present invention enables a secure virtual mining for permission-less blockchains using secure hardware, in particular by binding a height block information to the block signature.

At least one embodiment of the present invention may have the advantage of at least significantly reducing, in particular even completely preventing, intentional forks in the blockchain network. At least one embodiment of the present invention may have the advantage of not relying on reputation systems on the one hand and on the other hand of not requiring an identity manager in the blockchain network. At least one embodiment of the present invention may have the further advantage of increasing the efficiency of the computational resources of the blockchain network and increasing the security in the blockchain network.

The term "computer readable medium" may refer to any kind of medium, which can be used together with a computation device or computer and on which information can be stored. Said information may be any kind of data which can be read into a memory of a computer. For example said information may include program code for executing with said computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM. EEPROM or the like.

The terms "computing entity" and "computing device" may refer in particular in the claims, preferably in the specification each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entity/device may be identical forming a single computing device. The device(s)/entity(ies) may also be instantiated as a virtual device running on a physical computing resource. Different devices/entities may therefore be executed on said physical computing resource.

The term "computational resource" may be understood in its broadest sense and may refer in particular in the claims, preferably in the specification to any kind of physical and/or virtual computational or compute resource, resource, device, entity or the like adapted to perform computing and which can be used by applications, services, users, etc. to perform certain functions, services, applications or the like. A computational resource may include but is not limited to computes, networks, memories, storages, etc. For instance a compute resource may be a CPU resource that is part of the servers inside the datacenter. Thus a server can have Compute like CPU (or vCPU), Network like Network Interface card (NIC), Memory like RAM and/or Storage like external/internal HDD(s).

The term "decentralized blockchain consensus network" may be understood in the most general sense and may refer in particular in the claims, preferably in the specification to a network having a plurality of nodes providing decentralized storage among said participating nodes in the network. Each node has preferably a copy either a light version or a full version of the chain of blocks, wherein each block may be a closed ledger to agree universally on the data status.

The term "blockchain" may be understood, in particular in the claims, preferably in the description as a distributed database maintaining a continuously growing list of data records that are hardened against tampering and revision even by operators of the data storing nodes hosting database. A blockchain comprises for example two kinds of records: so-called transactions and so-called blocks. Transactions may be the actual data to be stored in the blockchain and blocks may be records confirming when and in what sequence certain transactions became journaled as a part of the blockchain database. Transactions may be created by participants and blocks may be created by users who may use specialized software or equipment designed specifically to create blocks. The term "blockchain" is e.g. identical to the Bitcoin blockchain as a digital currency was introduced in 2008.

The term "mining" with regard to a "block" may be understood in the most general sense and may refer in particular in the claims, preferably in the specification to a distributed computational review process performed on each "block" of data in a "blockchain". This allows for achievement of consensus in an environment where neither party knows or trusts each other. "Mining" is performed by a "miner".

The term "miner" may be understood in the most general sense and may refer in particular in the claims, preferably in the specification to an individual, person, user or the like who runs a computing entity to repeatedly calculate hashes with the intention to create a successful block and to earn coins from transaction fees and new coins created with the block itself.

The term "block information" may be understood in the most general sense and may refer in particular in the claims, preferably in the specification to information related, describing or specifying information of properties of a block of a blockchain.

The term "block height information" may be understood in the most general sense and may refer in particular in the claims, preferably in the specification to information related to, describing or specifying the height of a block of a blockchain.

The term "missing block information" may be understood in the most general sense and may refer in particular in the claims, preferably in the specification to information related to, describing or specifying a block which has been already confirmed by the blockchain network, but which has not been updated yet in a computing entity for performing signing.

The term "confirmed" with regard to a block of a blockchain may be understood in the most general sense and may refer in particular in the claims, preferably in the specification to a block which has already been included in the blockchain or—the other way round—the term "unconfirmed" means that a block has not yet been included in the blockchain, and is still reversible.

The term "signing request" may be understood in the most general sense and may refer in particular in the claims, preferably in the specification to a message, transmission, etc. comprising information for initiating a signing of data, information or the like. The information to be signed may be included in said signing request.

The term "last" with regard to the term "signing request" may be understood in the most general sense and may refer in particular in the claims, preferably in the specification to the most actual signing request already processed by the receiving entity and received prior to receiving another new signing request.

The term "matching" may be understood in the most general sense and may refer in particular in the claims, preferably in the specification to a successful comparison between at least two values of parameters or the like.

Further features, advantages and further embodiments are described or may become apparent in the following:

Said signing request may further include missing block information, said missing block information including confirmed blocks which have not been updated yet in said TEE-CE. This enables to further restrict the node to only work on one fork, that means a miner works only one fork at a time.

Said defined value may be set on at least one of: the value 1, the number of missing blocks, the sum of 1 and the number of missing blocks. This allows an easy way to check the number of missing blocks.

Signing according to c) may be further based on a, preferably accumulated, hash of the missing block information. This enables in an easy way to include information about the fork into the block signature in order that all nodes can verify it. The accumulated hash ensures that once chosen a branch, a node cannot exclude an already confirmed block in that branch.

The new block may be provided to the blockchain network by broadcasting. This enables in an easy way to distribute the new block among all participating node computing entities.

The TEE-CE may be provided as integral part of the MCE. This enables faster processing of signing by the corresponding mining computing entity in case the MCE has its own TEE-CE component.

In the following FIGS. 1-6 a public blockchain model is assumed. The blockchain network comprises a plurality of distributed nodes, who run a client application for peer-to-peer connection(s). The transactions are broadcasted into the blockchain network for public validation; each mining node then organizes the validated transactions into blocks, and mines the next legitimate block to be included into the blockchain. The mining protocol, which is executed by all miners and validated by all nodes, brings consensus to the transaction history in this distributed system. Miners may join and leave at any time in the process.

Figure 1:
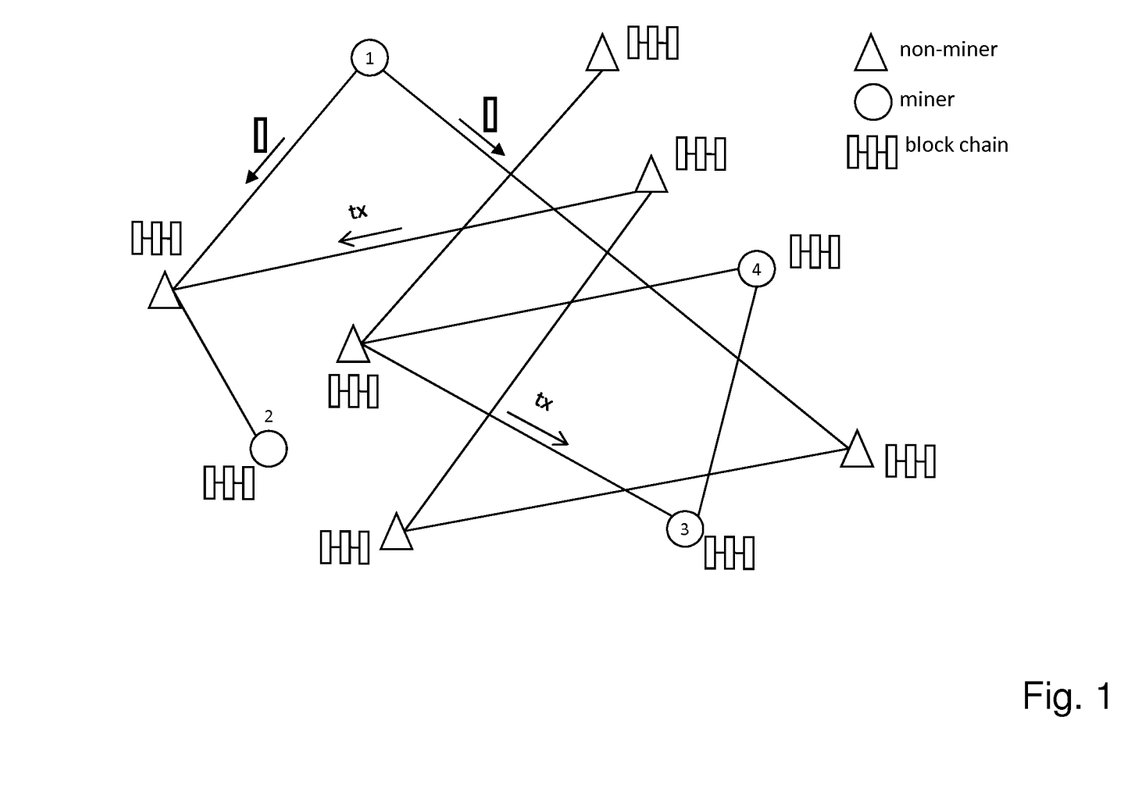
FIG. 1 shows steps of a method according to an embodiment of the present invention.

FIG. 1 shows a blockchain network with miners and non-miners. The current length of the block chain is 3, minor number one has just mined new block of the blockchain.

Further it is assumed that all nodes joining the blockchain network are equipped with secure hardware for providing a trusted execution environment. The certificates of all secure hardware can be verified by all other nodes given vendor's signature.

Each node has to use the registered credential to sign each mined block and the signature will be used as one of the factors of whether the node becomes a legitimate validator of the next block. Meanwhile, the secure hardware will track the block height information during the signing process. For example, in the signing request, the block height number is included in the block. The register of the secure hardware, such as a monotonic counter, will record this height number of the block that was just signed. If in the next signing request the input block height information is not monotonic, the secure hardware will reject to sign the block.

The following protocol describes the interface calls between the block mining process (miner) and the secure hardware (TEE):

| | |
|---|---|
| $miner_i \rightarrow$ TEE: | SIGN_REQ (block_info), where block_info = <transactions, previous_block, block_height, . . . > |
| TEE: | if $Reg_{last\_height}$ < block_height, $Reg_{last\_height}$ = block_height. |
| TEE $\rightarrow miner_i$: | $sig_i$ = $Sign_{SKi}$(block_info) |
| $miner_i$: | check if the new block is successfully mined: |

-continued

| | |
|---|---|
| | Verify(time, block_chain, new_block$_i$, account$_i$, sig$_i$, . . .); if true broadcasts new_block$_i$. |
| All miners: | if Verify(time, block_chain, new_block$_i$, account$_i$, sig$_i$, . . . ) is true, save new_block$_i$ to the local ledger and further broadcast it. |

Figure 2:
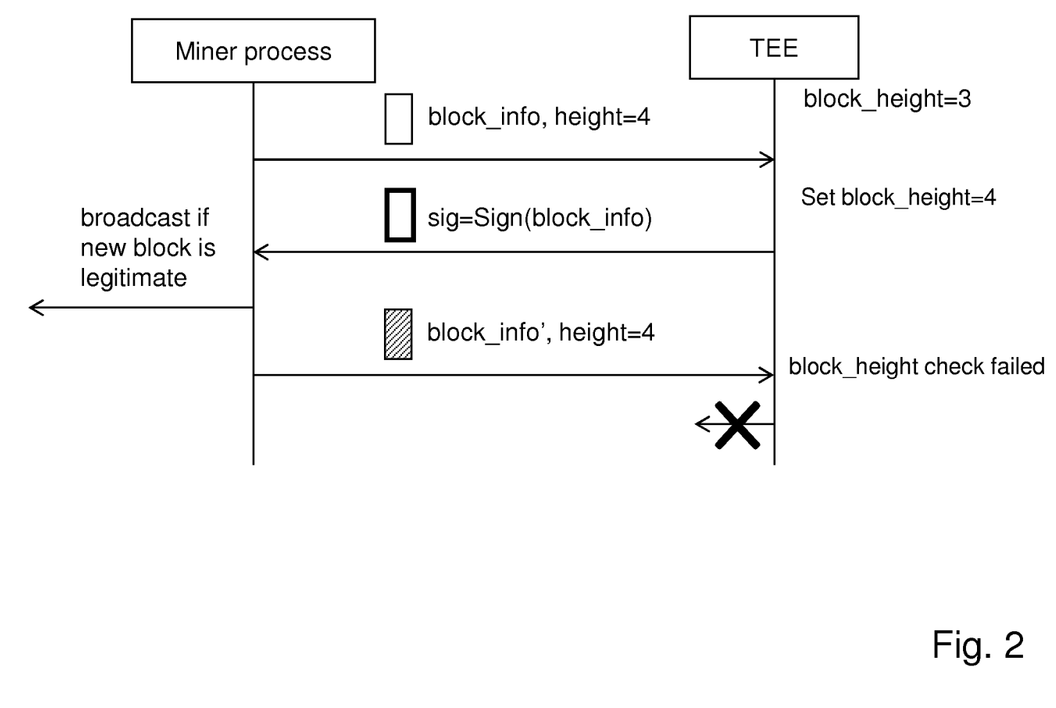
FIG. 2 shows more detailed steps of a method according to an embodiment of the present invention.

An example flow diagram for the interaction between the miner and its secure hardware is given in FIG. 2. FIG. 2 shows more detailed steps of method according to an embodiment of the present invention. In FIG. 2 interaction steps between the miner process and secure hardware TEE is shown to get the signature of the block that the node is mining: In the first step the miner process sends a signing request to its TEE comprising block information and the height of the block being equal to 4. The TEE detects that the height of the block for signing is incremental since the previous block height was equal to 3 and sets it to 4. The TEE signs the block and sends it back to the miner process.

The miner process checks if the block is successfully mined and if yes the new block is broadcast into the blockchain is network.

The above mentioned protocol or steps respectively ensure that a miner only has one chance to try generating a block at a certain height and can manage to generate at most one block at a certain height of all possible forks in the system. Although it does not restrict the miner to only work on one particular fork, a miner may initially work on the wrong fork and can switch to work on another fork later on. But it does guarantee that a miner can work on only one fork at a time, thus preventing nothing-at-stake.

Figure 3:
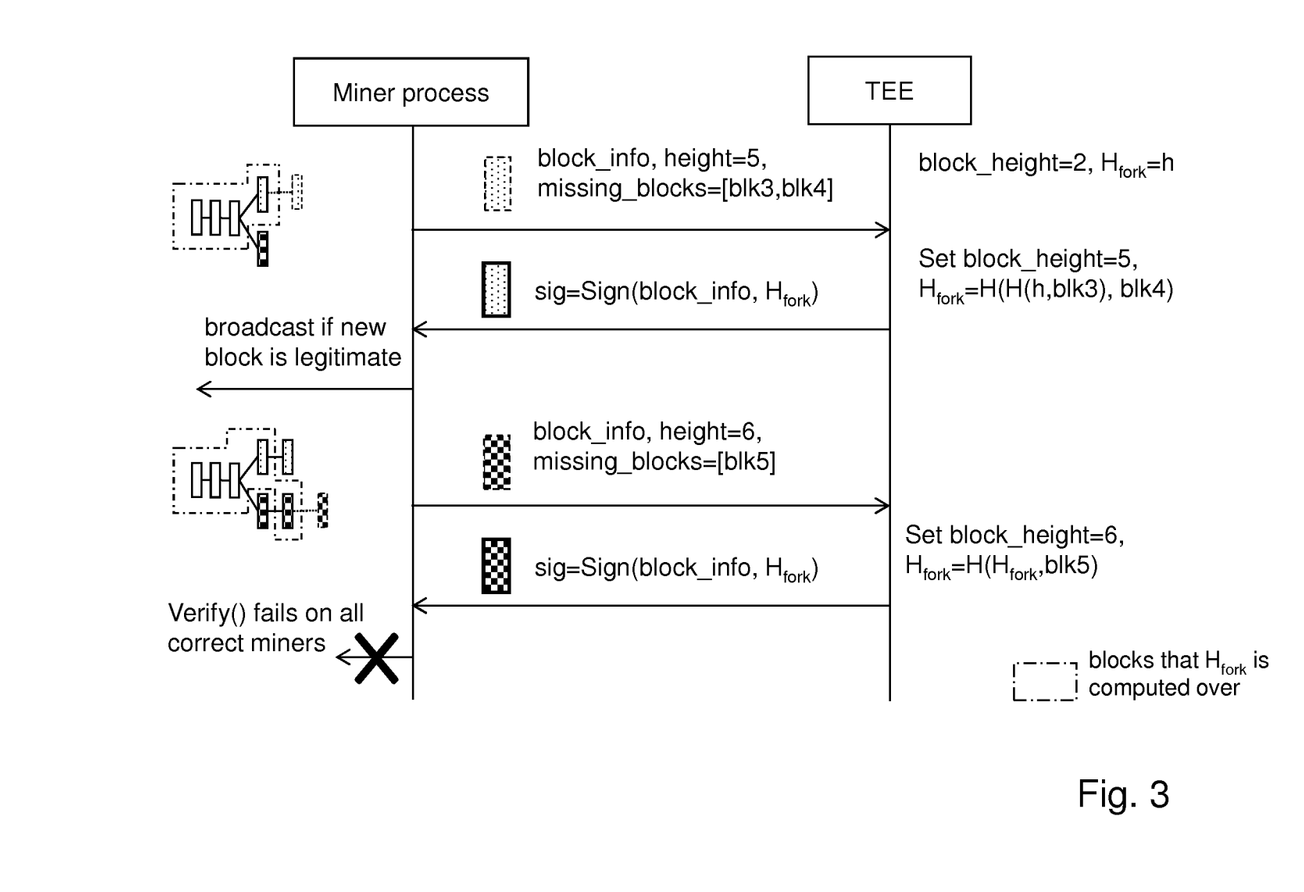
FIG. 3 shows more detailed steps of a method according to a further embodiment of the present invention.

FIG. 3 shows more detailed steps of method according to a further embodiment of the present invention. A misbehaved node mining on two branches that forks at block height=4. It is assumed that the blocks are immediately confirmed. Other miners cannot find a fork that matches the signed accumulated hash Hfork and thus will reject the new block. To further restrict the node to only work on one fork which supposes that a correct node is working on the correct fork (branch) from the beginning like e.g. Slash 2.0, the embodiment of FIG. 2 can be extended to include also the identity of the fork branch which is shown here in FIG. 3. The embodiment of FIG. 3 uses an accumulated hash over all the confirmed (according to Proof-of-Stake PoS) blocks to identify the fork that the mining node is working on and includes this fork information into the block signature, in order that all nodes can verify it. The accumulated hash in the secure hardware ensures that once chosen a branch, a node cannot exclude an already confirmed block in that branch.

The extended protocol of FIG. 3 works as follows:

| | |
|---|---|
| $miner_i$ -> TEE: | SIGN_REQ (block_info, <missing_blocks>), where block_info = <transactions, previous_block, block_height, . . . >, and <missing_blocks> contains all the previous blocks that are confirmed but not updated in the TEE since the last SIGN_REQ call. |
| TEE: | if $Reg_{last\_height}$ < block_height, $Reg_{last\_height}$ = block_height; and for each missing block j in the missing block list: $h_{accum\_hash}$ = $H(h_{accum\_hash}$, missing_block$_j$). Finally $Reg_{fork}$ = $h_{accum\_hash}$ |
| TEE -> $miner_i$: | $sig_i$ = $Sign_{SKi}$(block_info, $Reg_{fork}$) |
| $miner_i$: | check if the new block is successfully mined: Verify(time, block_chain, new_block$_i$, account$_i$, sig$_i$, . . . ); if true broadcasts new_block$_i$. Verify( ) retrieves the fork from the previous_block information and compares the accumulated hash over the blocks until the current block height. |

In FIG. 3 interaction steps between a miner process and a secure hardware TEE is shown to get the signature of the block that the node is mining: In the first step the miner process sends a signing request to its TEE comprising block information and the height of the block being equal to 5 together with two missing blocks, here block 3 and block 4. The TEE detects that the height of the block for signing is incremental since the previous block height was equal to 2 and sets it to 5 considering the two missing blocks and computes an accumulated hash with the fork hash and the hashes of the missing blocks. The TEE signs the block based on the accumulated fork hash and sends it back to the miner process. The miner process checks if the block is successfully mined and if yes the new block is broadcast into the blockchain network. If the fork is incorrect for a new block to be signed, other miners cannot find a fork matching the signed accumulated hash and they will reject the new signed block.

Figure 4:
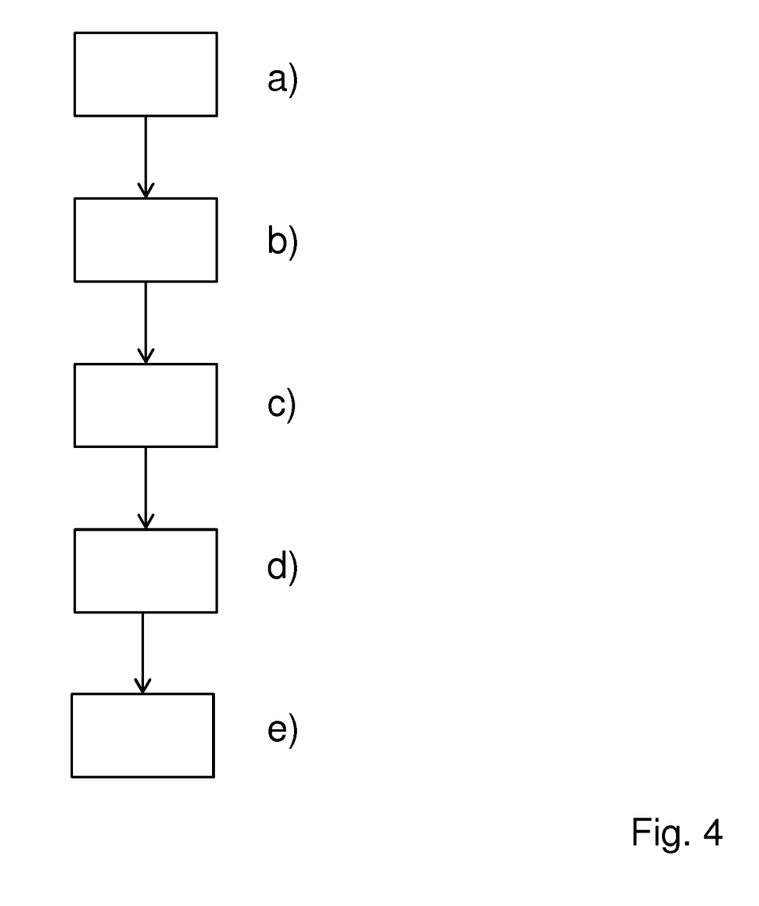
FIG. 4 shows steps of a method according to an embodiment of the present invention.

FIG. 4 shows steps of a method according to an embodiment of the present invention. In FIG. 4 a method for mining a block in a decentralized blockchain consensus network, 'DBCN', is shown, said method comprising the steps of:

a) Sending by a mining computing entity, 'MCE', a signing request for mining a new block of a blockchain to a trusted execution environment computing entity, 'TEE-CE', said signing request including block information, said block information including block height information, b) Comparing, by the TEE-CE, the block height information of the signing request with the block height information from the last signing request and providing a matching, when the difference between said two block height information satisfies a defined value c) Upon matching, signing, by said TEE-CE the new block based on the block information d) Saving the block height information of the signed block in a replay-attack-resistant memory by said TEE-CE and e) Providing, by said MCE, the new signed block to said DBCN.

Figure 5:
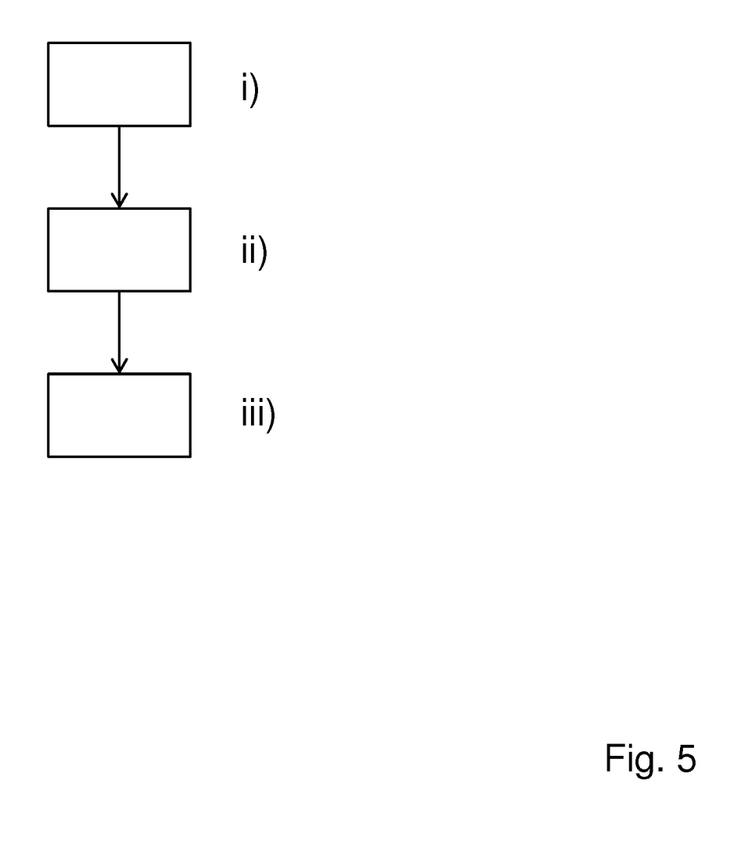
FIG. 5 shows steps of a method according to an embodiment of the present invention.

FIG. 5 shows steps of a method according to an embodiment of the present invention. In FIG. 5 a method for mining a block in a decentralized blockchain consensus network, 'DBCN', by a mining computing entity, 'MCE' is shown, comprising the steps of:

i. Sending a signing request for mining a new block of a blockchain to a trusted execution environment computing entity, 'TEE-CE', said signing request including block information, said block information including block height information ii. Receiving, upon successful matching, the signed new block based on the block information from the TEE-CE, and iii. Providing the new signed block to said DBCN.

Figure 6:
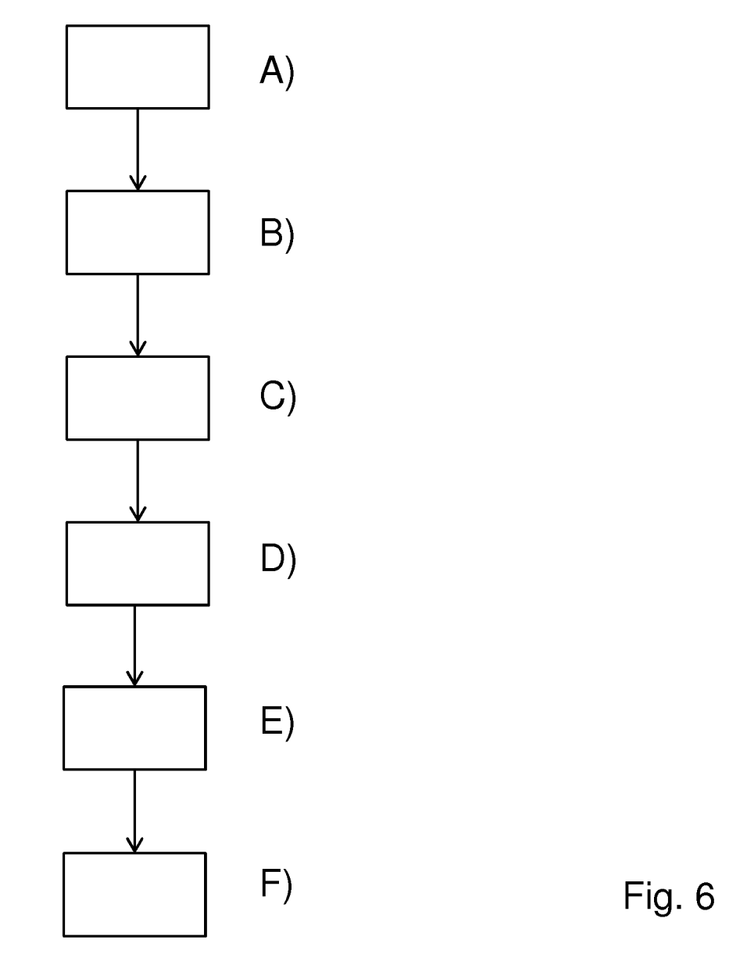
FIG. 6 shows steps of a method according to an embodiment of the present invention.

FIG. 6 shows steps of a method according to an embodiment of the present invention. In FIG. 6 a method for mining a trusted execution environment computing entity, 'TEE-CE', for signing a block of a blockchain in a decentralized blockchain consensus network, 'DBCN', adapted to:

A) Receive, from a mining computing entity, 'MCE', a signing request for mining a new block of a blockchain, said signing request including block information, said block information including block height information B) Compare the block height information of the received signing request with the block height information from the last signing request and C) Provide a matching, when the difference between said two block height information satisfies a defined value, D) Sign the new block based on the block information upon matching, E) Saving the block height information of the signed block in a replay-attack-resistant memory by said TEE-CE and to F) Send the signed new block to said MCE.

In a further embodiment the present invention provides a method comprising the steps of:

1) A node forwards the block signing request to the secure hardware, where the block information includes the block height.

2) Said node's secure hardware compares the block height in the request with the value stored from the last signing request. If the height is incremental, the secure hardware returns the signature and updates the block height.

3) The new block is broadcasted to the network and all nodes validate the new block according to the consensus protocol, where at least the signature of the block affects the validation outcome.

In summary, one or more embodiments of the present invention may provide or enable:

1) A signing of the outcome of virtual mining using Trusted Execution Environment (TEE)-based private keys and ensuring one signature per block height by the TEE; and/or 2) Including the summary of all previously confirmed blocks in the signature of the outcome of virtual mining and preventing miners from switching forks.

One or more embodiments of the present invention reduce or prevent misbehaving nodes from performing an attack by leveraging secure hardware for block signing process which validates the block height before generating the signature.

Conventional methods for virtual mining may only stop opportunistic attacks, but not those targeted attacks that intend to manipulate the transactions. This is the case since these conventional methods only cost the malicious nodes losing their deposits or rewards, which in some cases comparing to what they can gain, e.g., double-spend some transactions that involves huge amount of stake or transactions with important assets.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for mining a block in a decentralized blockchain consensus network (DBCN), the method comprising:

a) sending by a mining computing entity (MCE), a signing request for mining a new block of a blockchain to a trusted execution environment computing entity (TEE-CE), the signing request including block information, the block information including block height information, b) comparing, by the TEE-CE, the block height information of the signing request with block height information from a last signing request and providing a matching, responsive to determining that the difference between the block height information of the signing request and the block height information from the last signing request satisfies a defined value, c) upon providing the matching, signing, by the TEE-CE, the new block based on the block information, and d) providing, by the MCE, the signed new block to the DBCN, wherein the MCE and the TEE-CE each comprise one or more processors connected to a memory.

2. The method according to claim 1, wherein the signing request further includes missing block information, the missing block information including confirmed blocks which have not been updated yet in the TEE-CE.

3. The method according to claim 1, wherein the defined value is set on at least one of: the value 1, a number of missing blocks, a sum of 1 and the number of missing blocks.

4. The method according to claim 2, wherein signing according to c) is further based on a hash of the missing block information.

5. The method according to claim 1, wherein the new block is provided to the network by broadcasting.

6. The method according to claim 1, wherein the TEE-CE is provided as an integral part of the MCE.

7. A decentralized blockchain consensus network (DBCN), comprising:
 a plurality of node computing entities,
 at least one mining computing entity (MCE), and
 a trusted environment execution computing entity (TEE-CE),
 wherein the MCE is configured to:
  i. send a signing request for mining a new block of a blockchain to the TEE-CE, the signing request including block information, the block information including block height information,
  ii. receive, upon successful matching, a signed new block based on the block information from the TEE-CE, and
  iii. provide the signed new block to at least one node computing entity in the DBCN, and
 wherein the TEE-CE being adapted to:
  A) receive, from the MCE, the signing request,
  B) compare the block height information of the received signing request with the block height information from a last signing request,
  C) provide a matching, responsive to determining that a difference between the block height information of the received signing request and the block height information from the last signing request satisfies a defined value,
  D) sign the new block based on the block information upon providing the matching, and
  E) send the signed new block to the MCE,
 wherein each of the node computing entities, the at least one MCE, and the TEE-CE comprise one or more processors connected to a memory.

8. A mining computing entity (MCE) for mining a block in a decentralized blockchain consensus network (DBCN), the MCE being configured to:
  i. send a signing request for mining a new block of a blockchain to a trusted execution environment computing entity (TEE-CE), the signing request including block information, the block information including block height information;
  ii. receive, upon successful matching, the signed new block based on the block information from the TEE-CE, and
  iii. provide the signed new block to the DBCN,
   wherein the TEE-CE is adapted to compare the block height information of the signing request with block height information from a last signing request, provide a matching, responsive to determining that the difference between the block height information of the signing request and the block height information from the last signing request satisfies a defined value, and sign the new block based on the block information upon providing the matching, and
  wherein each of the MCE and the TEE-CE comprise one or more processors connected to a memory.

9. The MCE according to claim 8, the MCE comprising the TEE-CE.

10. A method for mining a block in a decentralized blockchain consensus network (DBCN) by a mining computing entity (MCE), the method comprising:
  i. sending a signing request for mining a new block of a blockchain to a trusted execution environment computing entity (TEE-CE), the signing request including block information, the block information including block height information,
  ii. receiving, upon successful matching, a signed new block based on the block information from the TEE-CE, and
  iii. providing the new signed block to the DBCN,
   wherein the TEE-CE is adapted to compare the block height information of the signing request with block height information from a last signing request, provide a matching, responsive to determining that the difference between the block height information of the signing request and the block height information from the last signing request satisfies a defined value, and sign the new block based on the block information upon providing the matching, and
  wherein each of the MCE and the TEE-CE comprise one or more processors connected to a memory.

11. A trusted execution environment computing entity (TEE-CE), for signing a block of a blockchain in a decentralized blockchain consensus network (DBCN), the TEE-CE being configured to:
  A) receive, from a mining computing entity (MCE), a signing request for mining a new block of a blockchain, the signing request including block information, the block information including block height information,
  B) compare the block height information of the received signing request with the block height information from a last signing request,
  C) provide a matching, responsive to determining that a difference between the block height information of the received signing request and the block height information from the last signing request satisfies a defined value,
  D) sign the new block based on the block information upon providing the matching, and
  E) send the signed new block to the MCE,
 wherein the MCE and the TEE-CE each comprise one or more processors connected to a memory.

12. A method for signing a block of a blockchain by a trusted execution environment computing entity (TEE-CE), comprising the steps of:
  A) receiving, from a mining computing entity (MCE), a signing request for mining a new block of a blockchain, the signing request including block information, the block information including block height information,
  B) comparing the block height information of the received signing request with the block height information from a last signing request,
  C) providing a matching, when the difference between the block height information of the received signing request and the block height information from the last signing request satisfies a defined value,
  D) signing the new block based on the block information upon matching, and E) sending the signed new block to the MCE,
   wherein the MCE and the TEE-CE each comprise one or more processors connected to a memory.

13. A non-transitory computer readable medium storing a program causing a computer to execute a method for mining a block in a decentralized blockchain consensus network (DBCN), the method comprising:
   a) sending, by a mining computing entity (MCE), a signing request for mining a new block of a blockchain to a trusted execution environment computing entity (TEE-CE), the signing request including block information, the block information including block height information,
   b) comparing, by the TEE-CE, the block height information of the signing request with the block height information from a last signing request and providing a matching, responsive to determining that a difference between the block height information of the received signing request and the block height information from the last signing request satisfies a defined value,
   c) upon matching, signing, by the TEE-CE the new block based on the block information, and
   d) providing the signed new block to the DBCN.

14. A non-transitory computer readable medium storing a program causing a computer to execute a method for mining a block in a decentralized blockchain consensus network (DBCN), the method comprising:
   i. sending by a mining computing entity (MCE), a signing request for mining a new block of a blockchain to a trusted execution environment computing entity (TEE-CE), the signing request including block information, the block information including block height information,
   ii. receiving, upon successful matching, the signed new block based on the block information from the TEE-CE, and
   iii. providing the signed new block to the DBCN,
      wherein the TEE-CE is adapted to compare the block height information of the signing request with block height information from a last signing request, provide a matching, responsive to determining that the difference between the block height information of the signing request and the block height information from the last signing request satisfies a defined value, and sign the new block based on the block information upon providing the matching, and
      wherein each of the MCE and the TEE-CE comprise one or more processors connected to a memory.

15. A non-transitory computer readable medium storing a program causing a computer to execute a method for signing a block of a blockchain, the method comprising:
   A) receiving, from a mining computing entity (MCE), a signing request for mining a new block of a blockchain, the signing request including block information, the block information including block height information;
   B) comparing the block height information of the received signing request with block height information from a last signing request;
   C) providing a matching, when a difference between the block height information of the received signing request and the block height information from the last signing request satisfies a defined value;
   D) signing the new block based on the block information upon matching; and
   E) sending the signed new block to the MCE,
      wherein the MCE comprises one or more processors connected to a memory.

* * * * *